E. I. DODDS.
STAY BOLT FOR BOILERS.
APPLICATION FILED NOV. 30, 1914.
1,188,912. Patented June 27, 1916.
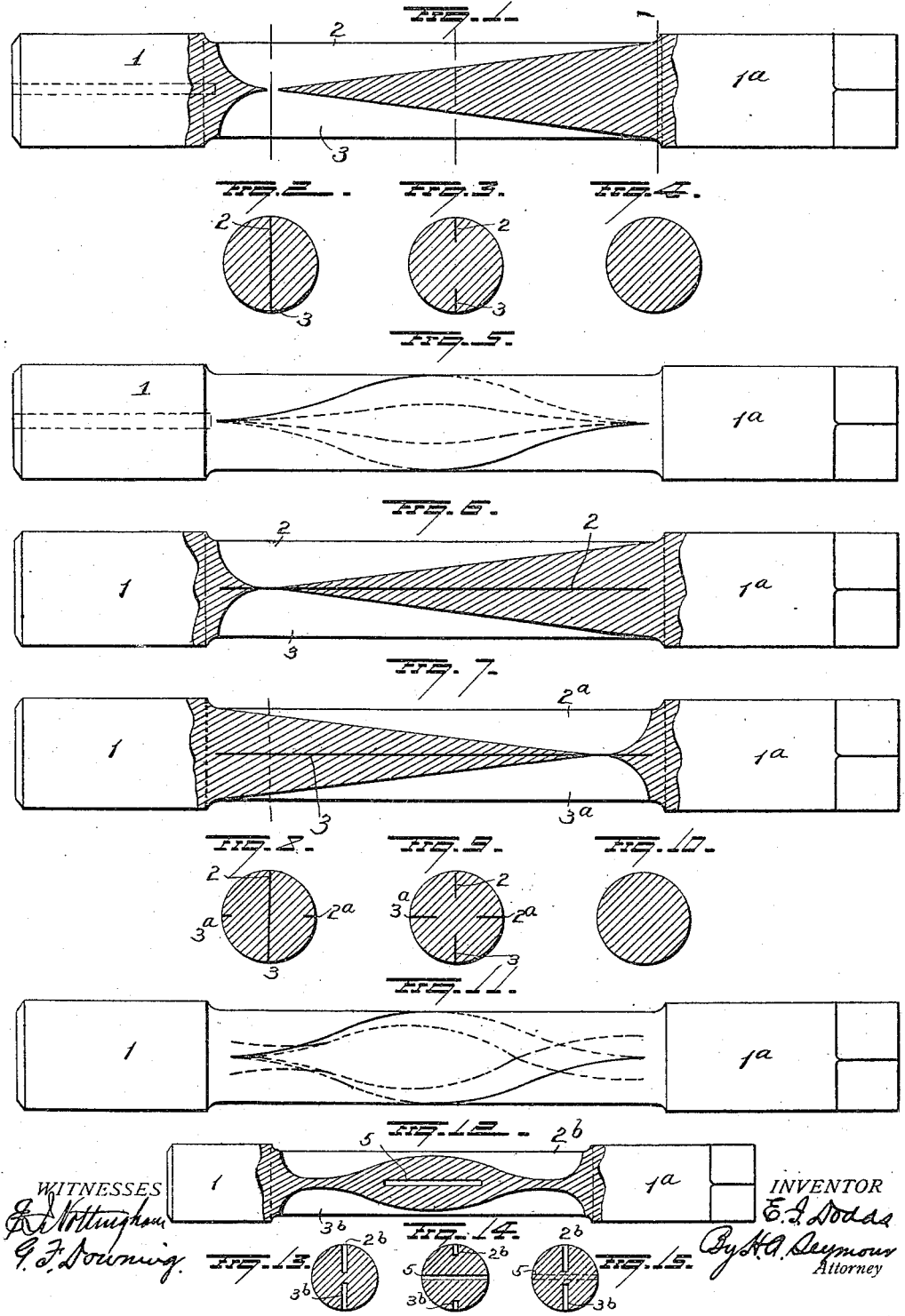

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT FOR BOILERS.

1,188,912.     Specification of Letters Patent.     Patented June 27, 1916.

Application filed November 30, 1914. Serial No. 874,822.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolts for Boilers; and I do hereby declare the following to be a full, clear, and exact description of the invention, such as will enable others skilled in the art to which it appertains to make and use the same.

My invention relates to an improvement in stay bolts for boilers, the object being to provide a bolt that will be flexible adjacent one or both heads of the bolt, so that it may accommodate itself to the lateral twisting or torsional strains imparted to it by the unequal movements of the boiler sheets, but which will be sufficiently rigid against longitudinal stresses to prevent any buckling or bending of the shank while the bolt is being applied to the sheets.

With this object in view my invention consists in the details of construction as will be more fully explained and pointed out in the claims.

In the accompanying drawings, Figure 1 is view in side elevation partly in section of a bolt embodying my invention; Figs. 2, 3, and 4 are sections of the same; Fig. 5 is a view showing the bolt shank twisted; Figs. 6 and 7 are views in elevation partly in section of a modified form of bolt; Figs. 8, 9 and 10 are views in transverse section of the same; Fig. 11 is a view showing the shank of same twisted; Fig. 12 is a view in section partly in elevation of another form and Figs. 13, 14 and 15 are views in transverse section of the same.

In the manufacture of this bolt, a bar of stay bolt metal is reduced between its heads 1 and 1ª to form the shank of the bolt, and this shank is slotted at diametrically opposite sides as at 2 and 3, the said slots starting from the surface at the end of the shank adjacent the head 1ª, and gradually increasing in depth toward the head 1, and preferably coming together adjacent said head 1, so that the point of greatest flexibility will be localized at the end of the shank adjacent the head 1. After the shank has been slotted, the slots are closed by hammering or between dies, without welding the walls of the slots, after which the heads 1 and 1ª are formed; the tell-tale hole bored in head 1, and the shank twisted about 180° as shown in Fig. 5, so as to carry the slot spirally around the shank.

In the construction shown in Figs. 6 to 11 inclusive, the slots are duplicated, and located 90° apart instead of 180° as in Fig. 1, the slots 2 and 3 being deeper adjacent the head 1, and the other pair of slots 2ª—3ª being deeper adjacent the head 1ª, thus rendering the shank equally flexible adjacent both heads.

In the construction shown in Figs. 12 to 15 inclusive, a single pair of oppositely disposed slots 2ᵇ and 3ᵇ are employed. These slots extend from one head to the other and are deeper at the ends and shallower at the center as shown in Fig. 12. In order to reduce the rigidity of the central portion of the bolt I prefer to slot it centrally as at 5.

In all instances, the shank of the bolt is twisted as shown in Fig. 5 so as to impart a spiral form to the slots.

By weakening the bolt adjacent one or both heads sufficient flexibility is provided, to permit of a comparatively free movement of the sheets to which the bolt is attached without unduly straining either sheet. It also localizes the strains to the part of the bolt containing the tell-tale, so that if the bolt does break, it will do so at the end containing the tell-tale and thus permit the escape of steam or water to indicate and locate the break.

The slots above referred to are formed by cutting or piercing the metal, instead of punching so that the capacity of the shank for endwise stresses is not weakened.

Having fully described my invention what I claim as new and desire to secure by Letters-Patent, is:—

1. As a new article of manufacture, a bolt having a head and a shank, the latter having oppositely disposed slots which are deepest adjacent the head.

2. As a new article of manufacture a bolt having a head and a shank the latter having oppositely disposed slots which are deepest adjacent the head, the said shank being twisted to impart spiral form to the slots.

3. As a new article of manufacture, a bolt having two heads and an intermediate shank, the latter having two pairs of oppositely disposed slots, one pair of slots being deepest adjacent one head and merging into the surface of the bolt near the other head and the other pair being deepest adjacent the opposite head and merging into the surface of the shank near the other head.

In testimony whereof, I have signed this specification in the presence of two subscribing witnesses.

ETHAN I. DODDS.

Witnesses:
WM. CHARLES BINGHAM,
EDWIN SPENCER RYCE.